(12) United States Patent
Underwood

(10) Patent No.: US 8,257,595 B2
(45) Date of Patent: Sep. 4, 2012

(54) CONTROL APPARATUS FOR A LIQUID DISPENSE SYSTEM

(75) Inventor: Lee Underwood, Hazlemere (GB)

(73) Assignee: VWS (UK) Limited, Marlow, Bucks (GB)

( * ) Notice: Subject to any disclaimer, the term of this patent is extended or adjusted under 35 U.S.C. 154(b) by 1023 days.

(21) Appl. No.: 11/989,370

(22) PCT Filed: Jul. 3, 2006

(86) PCT No.: PCT/GB2006/002468
§ 371 (c)(1),
(2), (4) Date: Jan. 25, 2008

(87) PCT Pub. No.: WO2007/015048
PCT Pub. Date: Feb. 8, 2007

(65) Prior Publication Data
US 2009/0134075 A1    May 28, 2009

(30) Foreign Application Priority Data

Jul. 30, 2005  (GB) .................................. 0515769.8
Feb. 10, 2006  (GB) .................................. 0602707.2

(51) Int. Cl.
*B67D 3/00* (2006.01)
(52) U.S. Cl. .......................................... 210/739; 222/1
(58) Field of Classification Search .............. 422/75, 422/77; 436/51; 222/1
See application file for complete search history.

(56) References Cited

U.S. PATENT DOCUMENTS 4,559,979 A * 12/1985 Koblasz et al. ................... 141/9
4,685,903 A    8/1987 Cable et al.
4,890,774 A * 1/1990 Poore .............................. 222/640
4,944,335 A * 7/1990 Stembridge et al. ............ 141/95
4,979,639 A * 12/1990 Hoover et al. .................... 222/1
(Continued)

FOREIGN PATENT DOCUMENTS

DE    19723852    12/1998
(Continued)

OTHER PUBLICATIONS

XP-002396830—Dr. Otto-Albrecht Neumuller: "Rompps Chemie-Lexikon", 1988, Franckh'Sche Verlagshandlung, Stuttgart, p. 4284.
(Continued)

*Primary Examiner* — Duane Smith
*Assistant Examiner* — Paul J Durand
(74) *Attorney, Agent, or Firm* — Drinker Biddle & Reath LLP

(57) ABSTRACT

A control apparatus for a liquid dispense system having at least one liquid outlet and at least one flow control device for controlling the dispense of liquid from said outlet(s) during a dispense operation, said control apparatus including an operating device for controlling the operation of at least one flow control device to permit dispense of a desired volume of liquid from the outlet(s) during a dispense operation; a recording device for recording one or more parameters of the liquid dispense system and/or the operating device during the dispense operation to create a dispense profile for the dispense operation, at least one of the recorded parameters being indicative of the flow rate of liquid at the outlet(s); and a control device for controlling the operation of the operating device during a subsequent dispense operation based upon the recorded dispense profile.

17 Claims, 3 Drawing Sheets

U.S. PATENT DOCUMENTS

| | | | |
|---|---|---|---|
| 5,027,284 A * | 6/1991 | Senghaas et al. | 700/240 |
| 5,454,406 A * | 10/1995 | Rejret et al. | 141/1 |
| 5,494,061 A | 2/1996 | Chan et al. | |
| 5,865,991 A | 2/1999 | Hsu | |
| 5,895,565 A | 4/1999 | Steininger et al. | |
| 6,148,717 A | 11/2000 | Lassota | |
| 6,312,589 B1 | 11/2001 | Jarocki et al. | |
| 6,319,414 B1 | 11/2001 | Wiseburgh et al. | |
| 6,372,505 B1 | 4/2002 | Aichert et al. | |
| 6,394,153 B2 * | 5/2002 | Skell et al. | 141/351 |
| 6,934,602 B2 * | 8/2005 | Sudolcan et al. | 700/244 |
| 2002/0060228 A1 | 5/2002 | Nicol | |
| 2005/0035152 A1 * | 2/2005 | Bethuy et al. | 222/129.2 |
| 2005/0127115 A1 | 6/2005 | Underwood | |

FOREIGN PATENT DOCUMENTS

| | | |
|---|---|---|
| EP | 0 676 731 | 10/1995 |
| EP | 1 134 190 | 9/2001 |
| GB | 1048948 | 11/1966 |
| GB | 2 258 216 | 2/1993 |
| WO | WO 03/078328 A1 * | 9/2003 |

OTHER PUBLICATIONS

XP-002396579—"Ullmanns Encyklopadie Der Technischen Chemie" 1980, Verlag Chemie, $4^{th}$ Edition, vol. 5, pp. 934-936, chapter 12 "Titrierverfahren".

* cited by examiner

CONTROL APPARATUS FOR A LIQUID DISPENSE SYSTEM

RELATED APPLICATION

This Application is the U.S. National Phase Application of PCT International Application No PCT/GB2006/002468 filed Jul. 3, 2006.

FIELD OF THE INVENTION

The present invention relates to a control apparatus for a liquid dispense system to allow liquid dispense operations to be carried out in a controlled and repeatable manner.

DESCRIPTION OF THE RELATED ART

In the field of liquid dispensing and, more particularly, in the field of water purification, distribution and dispensing for applications such as laboratories, medical, clinical, drinking, manufacturing and others, there are a number of methods for controlling the liquid or water that is dispensed from the system.

There are also various requirements of a user of such a system including filling empty containers and making up solutions to a known total volume. These operations of the dispense system will be laboratory specific and will depend upon the activities therein but are often repeated as the operations and vessels will be standard to the particular laboratory and may be detailed in Work Instructions or Standard Operating Procedures.

The simplest method is for a user of the water system to manually operate a valve and regulate the flow by the position of a valve. This has the advantage that the user is regulating the rate of water flowing from the system as well as being able to (roughly) control the total amount dispensed by being able to close the valve when the desired amount has been dispensed. It allows the user to dispense any amount of water, which is important when making up solutions that have a non-water component already in a flask. It is often the case that the water flow rate is reduced at the end of the fill operation to prevent splashing of water from a container or to allow a stop when a fill line marked on a container is reached, and this rate of flow may be as little as drop-wise dispense.

Electro-mechanical improvements to water dispense systems have been made with inputs such as potentiometers, angle encoders or keypads. Control of the dispense has been aided by microprocessor algorithms to give greater control at low flows, and greater control has been gained by control of the pump speed, use of proportional valves or multiple valves.

However, this method of dispensing usually still requires the user to be present at all times and, repeat accuracy can be user dependant. Close supervision or checks may be required for regulatory or procedural purposes and this may involve significant labour time.

Water dispensing systems have also been developed that reduce the input from the user. These have involved the pressing of a button to dispense a 'volume' of water, such as EP 1134190A. The volume may be determined either by a flow meter directly measuring the amount dispensed or by a timer dispensing for a known period. However, each of these arrangements has its disadvantages. Use of a flow meter requires extra components, and, as well as the cost, these are usually in the flow-stream and can re-contaminate the water. Flow meters may also be affected by fluctuations in conditions such as temperature and pressure. Timers are susceptible to specific site conditions, such as the feed pressure, which may reduce the accuracy of the dispensed volume. They may also be affected by changes to any processes within the equipment such as pump wear or filter blockage.

The input for these dispense methods allow set volumes to be dispensed, but these volumes are often only discreet values, such as 1, 2 or 3 liters. In other systems discreet fractions are allowed, but these require user input and a degree of calculation, or worse, guesswork, to ascertain the amount of water required to fill an already partly filled container, a common situation when preparing solutions.

SUMMARY OF THE INVENTION

It is an object of the present invention to provide an apparatus and method for overcoming these disadvantages.

Thus, according to one aspect of the present invention, there is provided a control apparatus for a liquid dispense system having at least one liquid outlet and at least one flow control device for controlling the dispense of liquid from said outlet(s) during a dispense operation, said control apparatus comprising:— operating means for controlling the operation of the at least one flow control device to permit dispense of a desired volume of liquid from said outlet(s) during a dispense operation;

recording means for recording one or more parameters of the liquid dispense system and/or the operating means during said dispense operation to create a dispense profile for said dispense operation, preferably at least one of said recorded parameters being indicative of the flow rate of liquid at the outlet(s); and control means for controlling the operation of the operating means during a subsequent dispense operation based upon the recorded dispense profile.

By recording the dispense profile of a first dispense operation, such dispense profile can be repeated, if desired, for subsequent dispense operations to dispense the same volume of liquid in a repeatable manner.

Once a dispense operation has been completed, the dispense profile may be stored in a memory device. Such a stored dispense profile is preferably labelled or tagged to permit selection by a subsequent user desiring the same profile.

In one embodiment, the control means and the recording means may comprise a microprocessor having an associated memory device.

The at least one flow control device may comprise a variable output pump and/or a flow control valve. The apparatus may also include one or more flow meters. Data from any such devices, valves and meters are recordable by the recording means during a dispense operation.

Preferably the recording means records the direct inputs of the user to the operating means and/or the parameters of the operating means to effect the user input.

The operating means may be any element or combination of elements adapted to provide operation, generally control, of the liquid dispense system, especially at the outlet. Such operating means may include one or more controllers, one or more sensing devices, and one or more input devices, generally including one or more user interfaces. Such input devices may be angle encoders, potentiometers, and key pads, or other such devices, by or through which a user can input information for a final liquid dispense.

Preferably the flow rate is varied during said dispense operation.

Parameters which are recordable by the recording means may be the direct parameters inputted by a user, and/or may be the parameters of the operating means to effect the user input. The latter can include the parameters of the controller to operate the outlet(s) and/or other parts of the apparatus, such as the control means for a pump that regulates output of the device, the voltage supplied to such a pump, as well as inlet and outlet valve positions and/or voltages.

Recordable parameters could include volume, time, speed and/or rate of flow, either directly or indirectly (i.e., voltages, sequences, settings, etc of the operating means, such as a controller), which parameters generally create a dispense profile over the operation or operation of the dispense. One or more of parts of the profile may be constant or variable.

For example, more accurate dispense may be desired by controlling the rate of release of liquid through the outlet using two or more flow rates, one flow rate being a relatively slow flow rate (such as up to 0.1 liter per minute), and another flow rate being a relatively fast flow rate, for example of up to 2 liters per minute, the relatively fast flow being useable between an initial slow rate period and a final slow rate period.

The operating means may also include one or more other devices such as one or more clocks, as well as other devices generally used in dispense system such as valves and pumps, preferably in the form of a circuit.

The recording means may be any suitable means able to record and store one or more of the parameters of a liquid dispense profile. The recording means may record all parameters of the profile, or those parameters necessary to be able to repeat the profile. The recording means may include a non-volatile memory device to store the dispense profile. Each dispense profile may be associated with an identifier to permit the user to subsequently identify and select a desired dispense profile for use in a subsequent dispense operation.

The recording means may be removable from the apparatus and replicated and/or used in a similar piece of apparatus. The recorded information, i.e. the dispense profile, may be removable, copyable or otherwise translatable to another system, unit or apparatus.

In a second aspect, the present invention provides a liquid dispense system comprising at least one liquid outlet, at least one flow control device for controlling the flow rate of liquid from said at least one liquid outlet, and a control apparatus according to the first aspect of the present invention.

Preferably the liquid is wholly or substantially water. In a preferred embodiment, the liquid dispense system is a water purification and dispensing system including one or more water purification means comprising one or more filter membranes, ion exchangers and/or ultra-violet irradiation means.

Where the system includes more than one outlet, each outlet may have the same or different liquid dispense profile and/or parameters. For example, each outlet may allow a different flow rate, pressure or time or timing of dispense. The outlet(s) may be local to the system or at distance from the system, and the outlet(s) may be optionally connectable either manually or electronically.

The system may also include one or more liquid inlets, optionally connected to a constant or large source of such liquid.

The system may further comprise liquid processing means, such as liquid purification means and/or additive dosing means, that may be selectively operable during the dispense operation. The operation and/or status of the process means may be recorded during the dispense operation as part of the dispense profile, to be repeatable during a subsequent dispense operation.

One or more measuring devices may be provided, such as flow meters, for determining if flow rate and or volume of dispense of a dispense operation matches that in a stored dispense profile.

The present invention allows a subsequent user to have the option of using one or more recorded dispense profiles when requiring a liquid dispense. If a required profile is selected, the control apparatus automatically operates the dispense system, with each part of the system performing the same actions as when recording of the selected dispense profile occurred.

In one embodiment, this can result in the same quantity of water being dispensed over a pre-determined time sequence at the same (including zero) flow rate at each time interval over the dispense operation to allow for mixing, or avoid splashing, or to make sure that when fill lines that indicate a desired volume are approached, the fill volume is not exceeded.

An algorithm may be provided in the control means to cause the liquid dispense flow rate to increase or decrease, for example by increasing or decreasing the output from a pump, and/or to adjust the time over which dispense takes place, to compensate for pressure changes in the liquid supply to the system or within the system, for example due to partially blocked filters. Such pressure changes may be detected and compensated for by comparing the measured flow rate with the expected flow rate stored in the dispense profile.

The present invention has no limitations on the type or amounts or variability of the information that are recordable by the recording means, e.g. on the possible volume, time and/or flow rate amounts or levels that are desired either directly or indirectly by a user.

The dispense may therefore be for any volume and involve any flow rate over any time period, providing the user with the control of being present and manipulating the valve while giving the simplicity of low input operation with a high reproducibility.

The dispense will allow a user to have both hands free to carry out other actions such as stirring mixtures etc.

The dispense will also not vary between the different users in a laboratory increasing repeatability between the various users and allows a manager or supervisor to set an operation that others can then follow without variation.

In a further embodiment of the present invention, the liquid dispense system can include process operations that may be in operation or not during the dispense operation. This allows water to be purified and dispensed to a level that is suitable for the application that the water is required for, without unnecessary wear of components or exhaustion of consumables. These process operations are selectable or not via the input device or via another electronic input and the status of these could also be recorded during the dispense operation, and could be repeated during a subsequent dispense operation. The dosing of additives may be recorded and repeated in a similar manner. When the user wishes to repeat the dispense operation, he selects the desired dispense profile and the required processes and dispense is carried out automatically without other input.

In a further embodiment of the invention the water system may also include measuring devices such as flow meters that check whether the flow matches that in the dispense profile. If there are discrepancies in the values, as may occur for example due to pressure changes in the system as filters block, then an algorithm in the operating means, such as the controller microprocessor, can cause the flow to increase or decrease by increasing or decreasing the output from a pump, or the microprocessor may adjust the time that the valves are in a particular state. In such cases, the same liquid dispense is achieved.

According to third aspect of the present invention there is provided a method of controlling a liquid dispense system comprising recording one or more parameters of the liquid dispense system and/or an operating means of the liquid dispense system during a dispense operation to create a dispense profile for said dispense operation, at least one of said recorded parameters being indicative of the flow rate of liquid at the outlet(s); and
controlling the operation of the operating means during a subsequent dispense operation based upon the recorded dispense. The flow rate may be varied during said dispense operation.

The present invention provides a method whereby a liquid dispense operation can be repeated one or more times by the same or other users preferably by the control apparatus including a repeat recorded profile means, such as a button or keypad input. The recorded dispense profile could optionally be adaptable, such as by its inclusion in one or more other liquid operations and/or other dispense profiles or by re-programming by users.

BRIEF DESCRIPTION OF THE DRAWINGS

An embodiment of the present invention will now be described by way of example only, and with reference to the accompanying drawings in which.

DETAILED DESCRIPTION OF THE INVENTION

Figure 1:
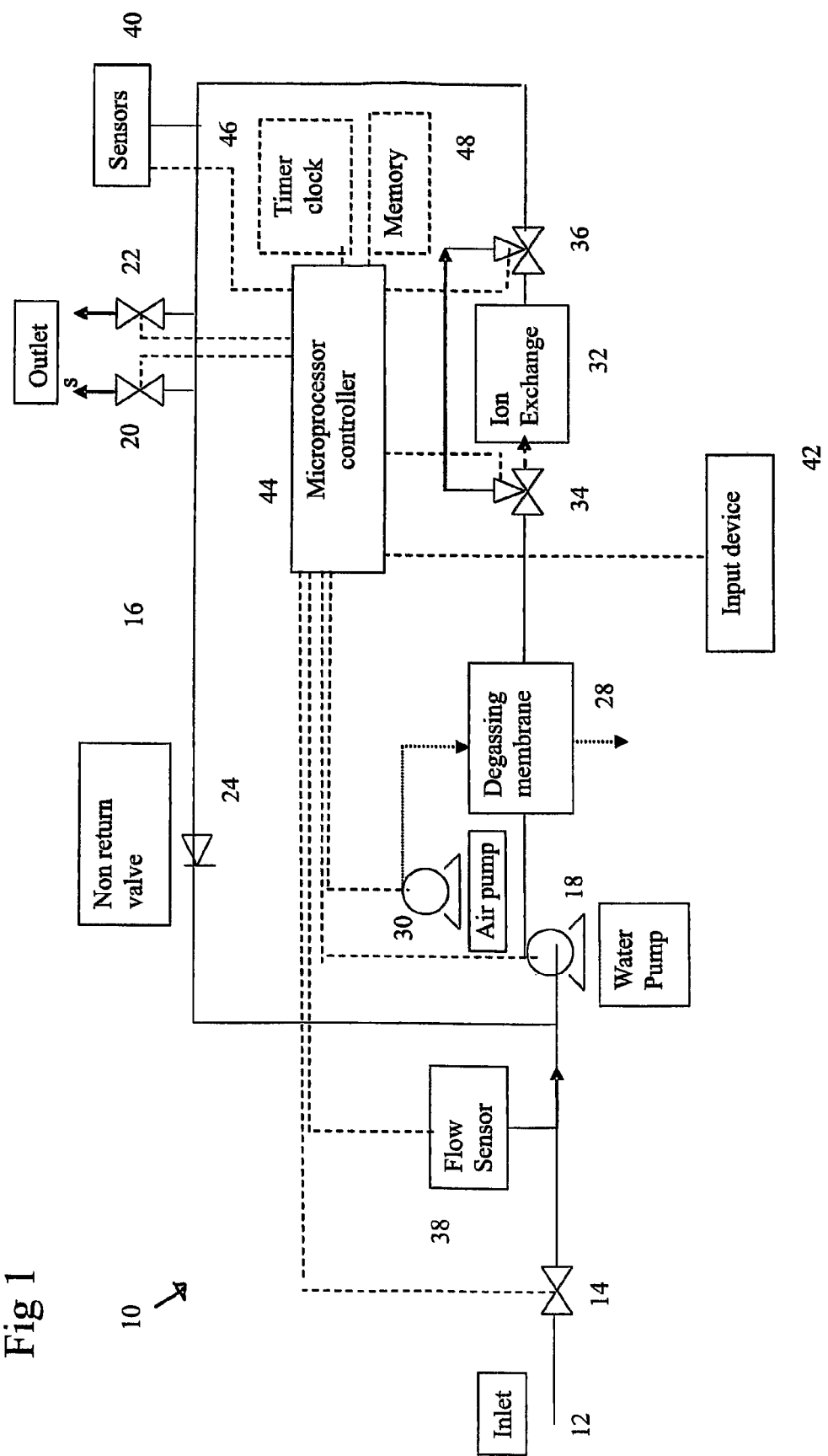
FIG. 1 is a schematic plan of a water purification and dispense system.

Referring to the drawings, there is shown in FIG. 1 a water purification and dispensing system, 10, comprising a feed water inlet line, 12, that passes through an inlet valve, 14, to a recirculation loop 16, around which the water is pumped by pump 18. Water can be dispensed by one or more valves 20, 22, which may be of different size or at different localities, to an outlet or outlets. A non-return valve 24 provides a back pressure to push the water through the dispense valves 20, 22.

In the recirculation loop are placed purification processes. Shown in FIG. 1 are a degassing membrane, 28, with its associated air pump, 30, and an ion exchange cartridge 32, but it will be appreciated by those with knowledge of the art that various processes, including, but not limited to filtration, activated carbon, reverse osmosis, electrodeionisation or ultra-violet irradiation may also be used. Valves 34, 36 are present which allow the ion exchange cartridge to be bypassed when not required.

A flow sensor, 38, is fitted to the inlet line, and sensors, 40, such as for quality, temperature and pressure, are fitted to the recirculation loop.

An input device user interface, 42, such as an angle encoder and keypad, which may contain a display, connects into a microprocessor controller 44. A timer clock 46 may be a discreet device or may be part of the controller 44. The microprocessor links to each of the electrical devices to control their actions. All such elements can comprise the operating means. A recording means with an associated memory, 48, may be part of the controller or may be a separate item, such that separate memories are used for separate purposes or users. This may be required for reasons of security or procedure.

Figure 2:
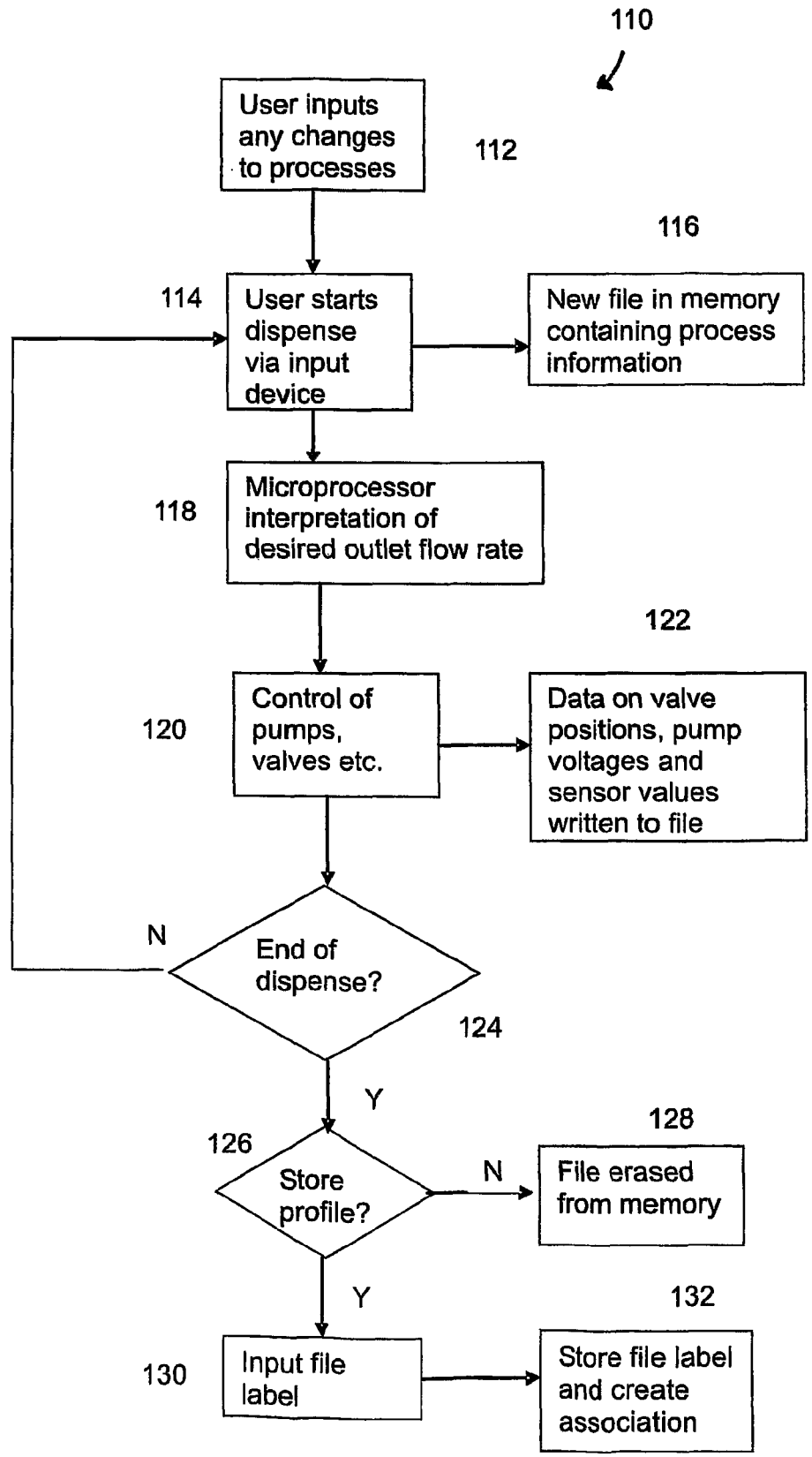
FIG. 2 is a block diagram showing the process of recording a dispense profile.

The methodology for recording a dispense profile is shown in FIG. 2 which shows a block diagram of the actions, 110. When a user wishes to dispense water he uses the input device, 42, to set any changes to the regular process activities that he desires, step 112, or selects a desired outlet valve 20, 22. This may be to avoid operation of the degassing section by setting the air pump, 30 to remain off during the dispense so saving wear on the pump, or could be to set the valves 34 and 36 to bypass the ion exchange cartridge, 32, to prevent its exhaustion and lengthen its lifetime.

At step 114 he uses the input device, 42, to start dispensing, and the microprocessor 44 opens a new file to record the necessary system parameters, such as the process settings, 116. At step 118 the microprocessor 44 interprets the signal from the input device 42 and in step 120 controls the water pump, 18 and valves 14, 20, 22 as necessary to achieve the desired outlet flow rate. Manipulation of the input device 42 by the user can alter the rate of flow at the outlet as desired. Throughout the dispense operation the microprocessor 44 writes the condition of each operation of each element or component of the system 10 to the memory, step 122. Once the dispense operation is complete, the user could set the input device 42 to an off position. Alternatively a button press can be used to verify the end of the dispense operation, step 124.

The system 10 then asks the user whether the profile should be retained in the memory for future use, step 126. The user uses the input device 42 to signal whether it should or not. If not then the profile is removed from the memory, step 128. If the user indicates that the profile should be kept, then the system 10 asks for a label to be applied to the label, step 130. If no label is supplied a default label can be given. An association is then created between the label and the profile in step 132. The label may alternatively be given prior to the commencement of the dispense operation. The label may be text, numerical, date/time and/or pictographic as desired.

Figure 3:
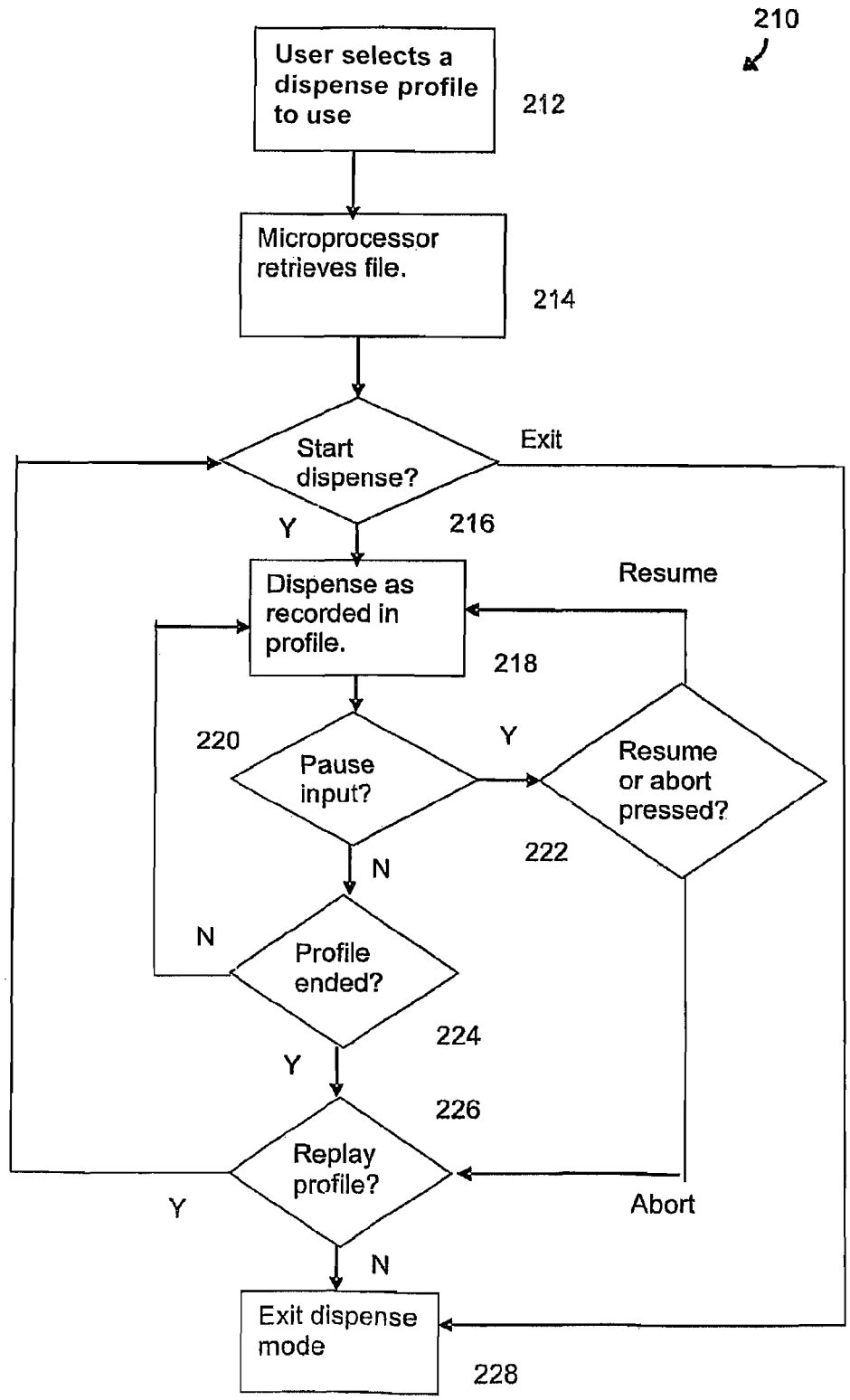
FIG. 3 is a block diagram showing the process of dispensing using a recorded dispense profile.

The methodology for the use of a recorded dispense profile is shown in FIG. 3 by a block diagram of the actions, 210. When the user wishes to dispense a pre-recorded dispense profile he uses the input device 42 to select a profile from those stored by using the label associated with the required profile, step 212. The microprocessor 44 retrieves the profile from the memory 48, step 214, and, after a 'start dispense' input is given at step 216, starts to give signals to the various elements of the operating means to carry out the dispense, step 218. The same dispense will then be carried out with control functions (usually, although not necessarily) operating in the same way and resulting in the required flow being dispensed.

While carrying out the dispense, the user may interrupt the dispense via the input device 42, step 220. This may be required if other activities in the laboratory necessitate it. Another input could then either abort the dispense or restart it where it was interrupted, step 222. The microprocessor 44 will also monitor whether the dispense has ended, step 224. When the profile is complete, the microprocessor 44 asks via the input device display whether the same profile should be re-run, step 226. This may be useful in certain situations, and will save the user having to re-find the profile from those stored. If the profile is not to be re-run, the water system exits the dispense mode, step 228.

The present invention allows a user to repeatedly dispense the same volume, flow etc of liquid from a liquid system in a manner that is suitable for each of his applications, and to do so in full control of the rate at which the liquid is dispensed throughout the dispense operation.

The invention claimed is:

1. A method of controlling a water purification and dispensing system for purifying and dispensing water comprising at least one water outlet, at least one water outlet, at least one flow control device for controlling the flow rate of water from said at least one water outlet, one or more water purification means for purifying a stream of water and a control apparatus, the control apparatus comprising operating means for controlling the operation of the at least one flow control device to permit dispense of a desired volume of water from said at least one water outlet during a dispense operation; recording means for recording one or more parameters of the operating means during said dispense operation to create a dispense profile for said dispense operation; and control means for controlling the operation of the operating means during a subsequent dispense operation based upon the recorded dispense profile, the method comprising the steps of:

creating, via a computer, a new data file at the start of a user initiated dispense operation, the data file for storing data associated with the dispense operation;

repeatedly writing data on parameters including one or more of valve positions, pump voltages and sensor values to the data file until the end of a dispense operation to create a dispense profile;

labelling or tagging the dispense profile with a unique identifier to permit identification of a recorded dispense profile for selection of the recorded dispense profile by a subsequent user desiring the same dispense profile;

permitting a selection by a subsequent user of the unique identifier for a recorded dispense profile to use for controlling a subsequent dispense operation; and controlling the operation of the operating means during a subsequent dispense operation based, upon the selected recorded dispense profile for dispensing water out of the at least one water outlet in accordance with the recorded dispense profile.

2. A method as claimed in claim 1, wherein recording the parameters comprises recording data pertinent to at least the flow rate of water at the at least one water outlet.

3. A method as claimed in claim 1, further comprising storing the dispense profile in the memory device once a dispense operation has been completed and wherein the labelling or tagging involves applying a unique identifier to the dispense profile inputted by the user.

4. A method as claimed in claim 1, wherein the at least one flow control device comprises a variable output pump and/or a flow control valve.

5. A method as claimed in claim 1, wherein the operating means includes one or more controllers, one or more sensing devices, and one or more input devices, including one or more user interfaces.

6. A method as claimed in claim 5, wherein the one or more input devices comprise at least one of an angle encoder, a potentiometer, and a key pad.

7. A method as claimed in claim 1, wherein the parameters recorded include a varying flow rate during said dispense operation.

8. A method as claimed in claim 7, wherein the varying flow rate during said dispense operation involves dispensing a first flow rate of water, followed by dispensing a second flow rate of water that is faster than the first flow rate, followed by dispensing a third flow rate of water that is slower than the first and second flow rates.

9. A method as claimed in claim 1, wherein the parameters recorded are indicative of a flow rate of water that is greater than zero and less than full flow.

10. A method as claimed in claim 1, wherein the parameters recorded are indicative of multiple flow rates of the water that are stored in a single dispense profile and dispensed during a single dispense cycle for filling the volume.

11. A method as claimed in claim 1, wherein the water purification and dispensing system includes a recirculation circuit between the inlet and outlet for recirculating water, and wherein the step of controlling the operating means involves controlling the channelling of water from the recirculation circuit to the outlet.

12. A method of dispensing water from a water purification and dispensing system for purifying and dispensing water comprising at least one water inlet, at least one water outlet, at least one flow control device for controlling the flow rate of water from said at least one water outlet, one or more water purification means for purifying a stream of water so as to provide water and a control apparatus, the control apparatus comprising:

operating means for controlling the operation of the at least one flow control device to permit dispense of a desired volume of water from said at least one water outlet during a dispense operation;

recording means adapted to receive information on parameters of the operating means including one or more of valve positions, pump voltages and sensor values associated with the dispense operation and for recording that information in a dispense profile; and control means for controlling the operation of the operating means during a subsequent dispense operation based upon the recorded dispense profile, the method comprising the steps of:

creating a new data file at the start of a user initiated dispense operation, the data file adapted to store data associated with the dispense operation being run by the user;

writing data on parameters related to the dispense operation including one or more of valve positions, pump voltages and sensor values to the data file throughout the dispense operation to create the recorded dispense profile for that particular dispense;

labelling or tagging the dispense profile with a unique identifier to permit identification of the recorded dispense profile for selection of the recorded dispense profile by a subsequent user desiring the same dispense profile;

permitting a selection of the unique identifier for a recorded dispense profile by a subsequent user to use for controlling a subsequent dispense operation; and controlling the operation of the operating means during a subsequent dispense operation based, upon the selected recorded dispense profile for dispensing water out of the at least one water outlet in accordance with the recorded dispense profile.

13. A method as claimed in claim 12, wherein the parameters recorded are indicative of a flow rate of water that is greater than zero and less than full flow.

14. A method as claimed in claim 12, wherein the parameters recorded are indicative of multiple flow rates of the water during a single dispense cycle that are stored in a single dispense profile for filling the volume.

15. A method as claimed in claim 12, wherein the varied flow rate output during said dispense operation involves dispensing a first flow rate of water, followed by dispensing a second flow rate of water that is faster than the first flow rate, followed by dispensing a third flow rate of water that is slower than the first and second flow rates.

16. A method as claimed in claim 12, wherein the water purification and dispensing system includes a recirculation circuit between the inlet and outlet for recirculating water, and wherein the step of controlling the operating means involves controlling the channelling of water from the recirculation circuit to the outlet.

17. A method as claimed in claim 12, wherein the step of labelling or tagging the dispense profile occurs after the user initiated dispense operation is complete.

\* \* \* \* \*